United States Patent [19]

Mangone, Jr.

[11] Patent Number: 4,956,142
[45] Date of Patent: Sep. 11, 1990

[54] APPARATUS AND METHOD FOR MOLDING THREE DIMENSIONAL ARTICLES

[76] Inventor: Peter G. Mangone, Jr., 28600 Buchanan Dr., Evergreen, Colo. 80439

[21] Appl. No.: 348,515

[22] Filed: May 8, 1989

[51] Int. Cl.$^5$ .............................................. B29C 45/36
[52] U.S. Cl. ................... 264/318; 264/328.7; 264/328.9; 264/328.12; 249/64; 249/152; 249/176; 249/180; 249/185; 425/438; 425/577; 425/DIG. 58; 425/442
[58] Field of Search .................. 264/318, 328.7, 328.9, 264/328.11, 328.12; 249/63, 64, 68, 145, 150, 152, 176, 178, 180, 184, 185; 425/577, DIG. 58, 438, 442

[56] References Cited

U.S. PATENT DOCUMENTS

| | | | |
|---|---|---|---|
| 3,559,249 | 2/1971 | Patton, Jr. ............................ | 249/145 |
| 3,843,088 | 10/1974 | McLoughlin et al. ............... | 249/184 |
| 4,502,659 | 3/1985 | Stephenson et al. ........ | 425/DIG. 58 |

Primary Examiner—Jill L. Heitbrink
Attorney, Agent, or Firm—Klaas & Law

[57] ABSTRACT

Apparatus and method for forming a three dimensional injection molded article having a pair of passageways extending therethrough and with a locking indentation in each passageway using first and second mold parts each having open ended cavities having an end wall and a plurality of sidewalls formed therein wherein a pair of fixed arms are mounted on the end wall of the first mold part so that they are spaced from each other and each of the sidewalls, have portions extending out of the open ended cavity and have contoured surfaces and wherein a pair of movable arms are mounted on the end wall of the second mold part for rotation about fixed axes and are spaced from each other and from each of the sidewalls and wherein each movable arm has a contoured surface adapted to be moved into a continuous contacting relationship with the contoured surface of one of the fixed arms and when in the contacting relationship to provide protruding portions to form said locking indentations. A cavity is formed by the first and second mold parts when they are in a closed position and plastic material is injected into the cavity at a location between the pair of movable arms to move them and their contoured surfaces into the continuous contacting relationship with the contoured surfaces of the fixed arms. After the injection material has been cured to form the three dimensional article, the fixed arms are withdrawn from the three dimensional article and thereafter, the movable arms are withdrawn from the three dimensional article.

20 Claims, 2 Drawing Sheets

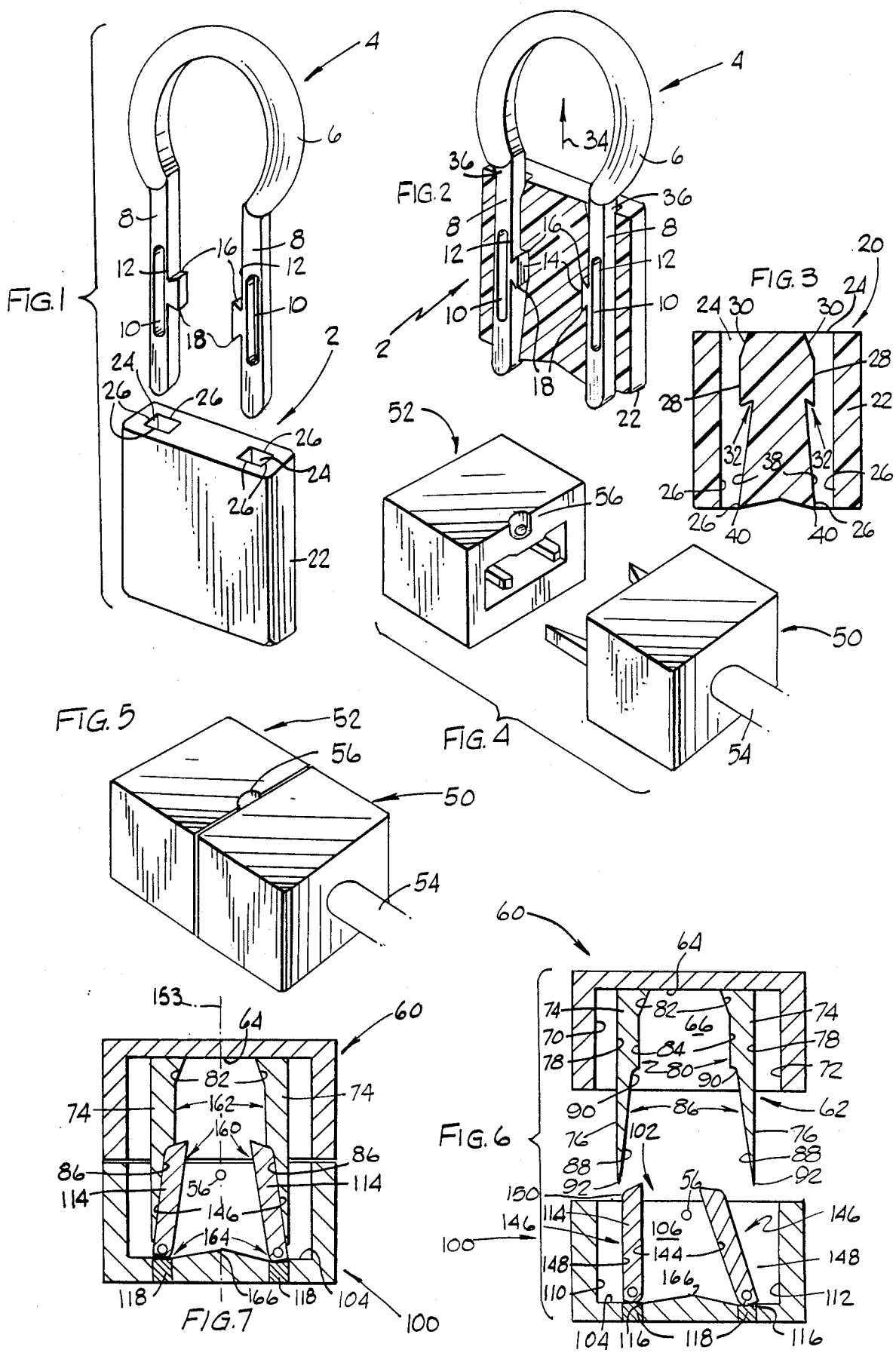

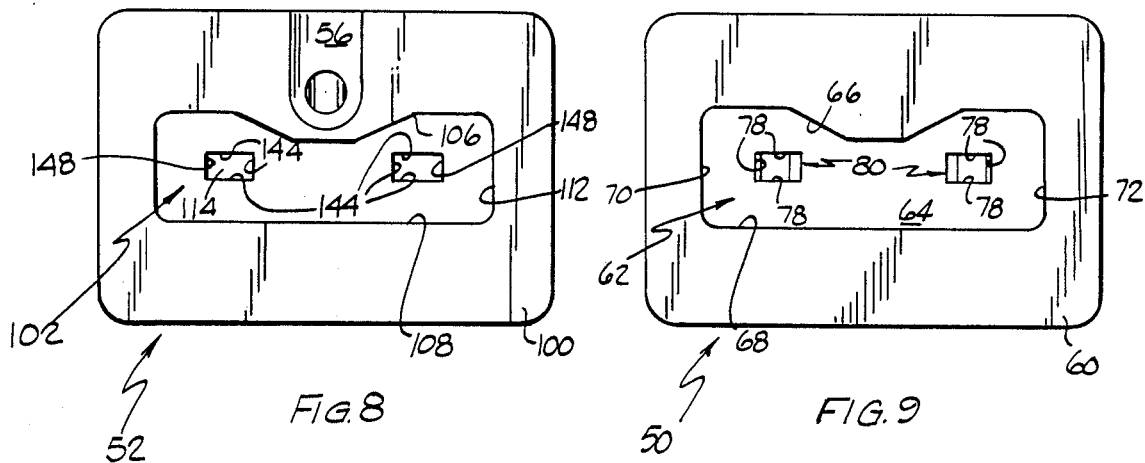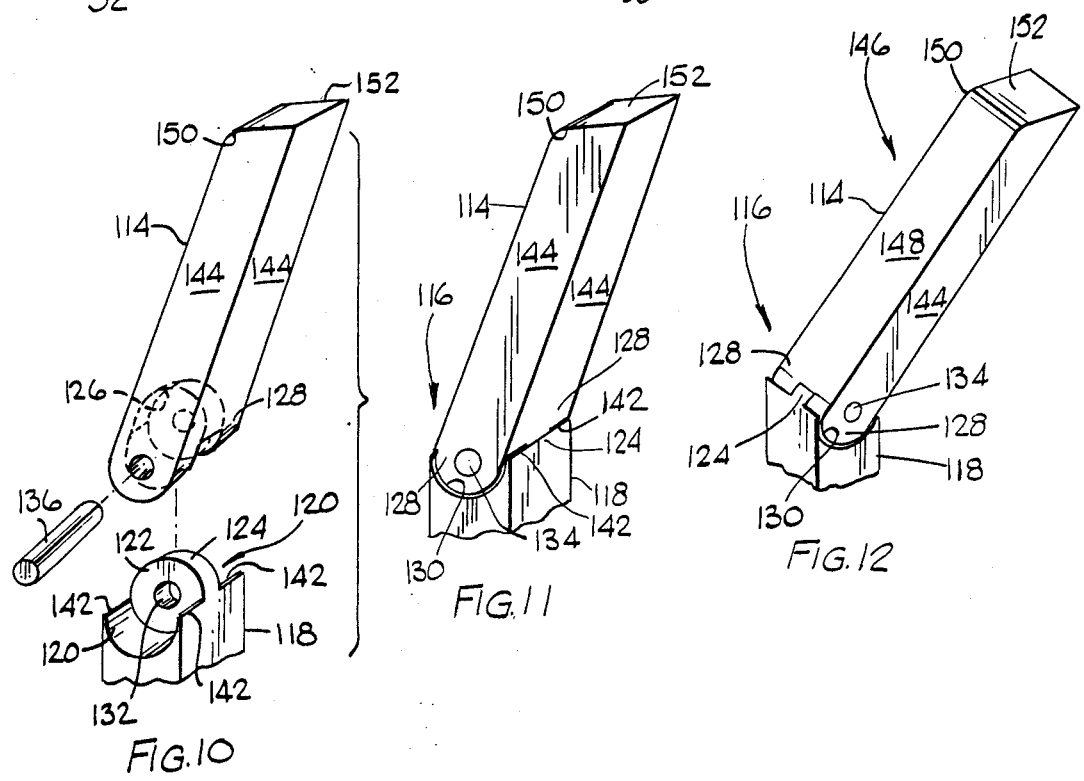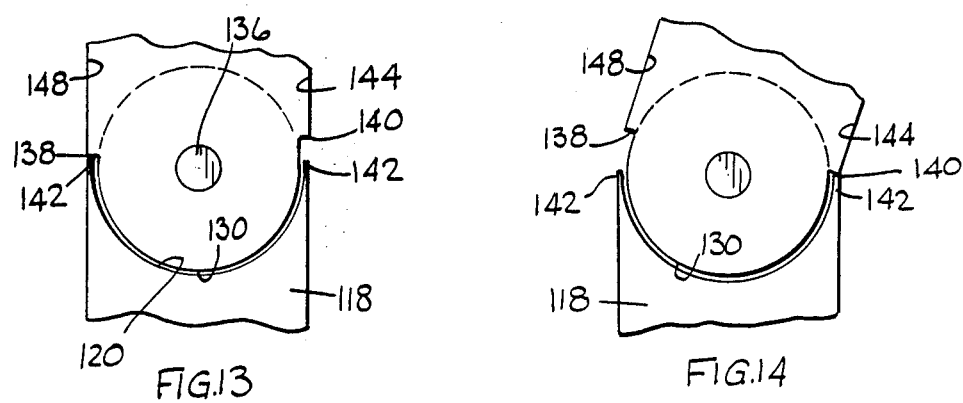

ID ARTICLES

FIELD OF THE INVENTION

This invention relates generally to the molding of three dimensional articles and more particularly to the molding of such articles having at least one passageway formed therein with an internal recess or indentation formed in such passageway.

BACKGROUND OF THE INVENTION

One type of lock used to control access to a container or other similar article is a plastic lock comprising a body portion and a link portion comprising an arcuately shaped portion having two integral parallel legs. The body portion has two passageways extending therethrough with an indentation in each passageway. The legs of the link portion are shaped to be able to be pushed through the passageways and are provided with a resilient projection. As the legs are pushed through the passageways, the resilient projections are compressed until they reach the indentations in the passageways and move into such indentations so as to be locked in position. The indentations and projections are designed to prevent movement only in one direction which is to prevent pulling of the legs out of the passageways after they have been locked. The arcuately shaped portion limits further inward movement of the legs after the projections have reached the indentations. When it is desired to gain access to the container, the portions of the legs between the arcuately shaped portion and the body portion are cut. The remaining portions of the legs are then pushed through the passageways and are then discarded with the arcuately shaped portion. The body portion is kept to be used with a new link portion to control access to another situation. The cost of the body portion is significantly greater than the cost of the link portion. This is primarily due to the manufacturing cost to form the indentations in the passageways. In one method of forming the body portion, two parts of a mold are moved in linear directions between an opened or a closed position and when in a closed position, they form a cavity. At least one of these mold parts contains a pair of fixed arms utilized to form the passageways. In addition, one of the mold parts contains a pair of rods having a controllable movement perpendicular to the fixed arms and locatable adjacent thereto so as to form the indentations in each passageway. The movable rods are moved through one part of the closed mold into the appropriate position in the cavity while the mold is in the closed position. After the plastic material has been injected into the closed mold and cured, the movable rods are first withdrawn and then the two part mold is moved to the opened position and the formed body portion is removed. This method forms the necessary indentations in the passageway but also forms two openings in the body portion which then have to be sealed over. Thus, there existed a need for a new more economical system for forming such body portions.

BRIEF DESCRIPTION OF THE INVENTION

This invention provides apparatus and method for forming an injection molded three dimensional article having at least one passageway formed therein with an indentation formed in such passageway wherein the article leaving the mold is ready for use without any significant additional operations to be performed thereon.

In a preferred embodiment of the invention, the three dimensional article is described in relation to the injection molding of plastic material to form the body portion of the above-described plastic lock, but it is understood that the three dimensional plastic article can be for any purpose or shape and be formed from any injection moldable material. Also, the three dimensional plastic article can have one or more passageways formed therein. The apparatus and method for the system described herein utilizes a two part mold. A first mold part comprises a body member having an open ended cavity formed therein and defined by an end wall and a plurality of sidewalls. A pair of fixed arms on the end wall project outwardly from the open ended cavity. The fixed arms are spaced from each other and from each of the plurality of sidewalls and are in a generally parallel relationship. At least one contoured surface is formed on each of the pair of arms and these contoured surfaces are in a facing relationship. A second mold part comprises a body member having an open ended cavity formed therein and defined by an end wall and a plurality of sidewalls. A pair of movable arms are pivotally mounted in mounting means on the end wall for limited free rotational movement each about its own fixed axis through a predetermined arc. The movable arms are spaced from each other and from each of the plurality of sidewalls. At least one contoured surface is formed on each of the movable arms and they are located so that facing portions of the contoured surfaces of the fixed and movable arms are in continuous contacting relationship while the three dimensional plastic article is being formed. Moving means are provided for moving the first and second mold parts to an opened or closed position. Also, a conventional gate is formed in one of the mold parts through which the plastic material is injected in a conventional manner and a conventional ejecting system is employed to remove the three dimensional article from the second mold part.

In operation, the movable arms may be at any location between their limited arc of rotational movement. The free end of the contoured surface of each fixed arm is tapered with the smallest portion thereof closest to the free end of the contoured surface of each of the movable arms. If a movable arm is at one end of its arc of rotation, the free end thereof will be contacted by the tapered surface of the fixed arm and be rotated thereby as the first and second mold parts are being moved to a closed position. Each fixed arm has a length such that, when the first and second mold parts are in a closed position, the extremity of each fixed arm is substantially in contact with a portion of the mounting means for the movable arms. Also, the gate opening through which the plastic material is injected is located between the two movable arms. Therefore, in the closed position, even, if both movable arms are at the other end of its arc of rotation, or in any way in less than complete contact with the fixed arm portions, as the plastic material is injected into the closed mold, it contacts the two movable arms and rotates them until the facing portions of the contoured surfaces of each movable arm and each fixed arm are in a continuous contacting relationship. In this relationship, a combined fixed and movable arm has three substantially planar surfaces and one non-planar surface to provide a protruding portion with the non-planar surfaces in a facing relationship. The fixed and movable arms combine to form a pair of spaced apart members each extending between the end walls of the first and second mold parts and each having a relatively large internal transverse cross-sectional configuration that is greater than the smallest internal transverse cross-sectional configuration between the relatively large internal transverse cross-sectional configuration and either of the end walls of the first and second mold parts so as to form the internal indentation. Also, the pivotal mounting means, the fixed arms and the movable arms, while in the above-described relationship, provide no openings into which the plastic material can flow. After the plastic material has been cured, the first and second mold parts are moved to an opened position. While the first and second mold parts are moving to the opened position, the fixed arm withdraws with the first mold part to which it is attached and the movable arm rotates as necessary to facilitate its removal from the interior of the plastic article while the three dimensional plastic article having a pair of spaced apart passageways each having at least one uni-directional locking indentation formed therein is ejected therefrom.

BRIEF DESCRIPTION OF THE DRAWINGS

An illustrative and presently preferred embodiment of the invention is shown in the accompanying drawings in which:

FIG. 1 is an exploded perspective view of a plastic lock;

FIG. 2 is a perspective view with parts in section of FIG. 1 in an assembled relationship;

FIG. 3 is a cross-sectional view of the body portion of FIG. 2;

FIG. 4 is a perspective view of a mold in an open position;

FIG. 5 is a perspective view of FIG. 4 in a closed position

FIG. 6 is a cross-sectional view of a mold of this invention in an opened position;

FIG. 7 is a cross-sectional view of the mold of this invention in a closed position;

FIG. 8 is a front elevational view of the lower portion of FIG. 6;

FIG. 9 is a front elevational view of the upper portion of FIG. 6;

FIG. 10 is an exploded perspective view of the movable arm of this invention and its mounting means;

FIG. 11 is a perspective view from the right side of FIG. 10;

FIG. 12 is a perspective view from the left side of FIG. 10;

FIG. 13 is an enlarged plan view of a movable arm at one end of its arc of rotation; and FIG. 14 is an enlarged plan view of a movable arm at the other end of its arc of rotation.

DETAILED DESCRIPTION OF THE INVENTION

In FIGS. 1-3, there is illustrated a plastic lock 2 of the type described above and a body portion formed in accordance with this invention. While the invention is described in relation to the plastic lock, it is understood that a three dimensional plastic article having at least passageway and one indentation may be formed in accordance with this invention and be for any use and of any shape. Also, as stated above, the three dimensional article can be formed using any desirable injection moldable material. The plastic lock 2 has a link portion 4 comprising an arcuately extending portion 6 and two integral legs 8 each having a generally square cross-sectional configuration. Each leg 8 has a longitudinally extending slot 10 formed therein with the wall 12 of each leg 8 adjacent to the slot 10 being relatively thin so as to permit flexing thereof. A locking member 14 projects outwardly from each wall 12 and has a pair of spaced apart hook portions 16 and 18 for purposes described below. The body portion 20 for the plastic lock 2 comprises a three dimensional housing 22 having a pair of spaced apart passageways 24. Each passageway 24 has three sidewalls 26 having generally planar surfaces and one sidewall 28 having a non-planar surface. Each sidewall 28 has an inclined surface 30 at the entrance to each passageway 24 so that the greatest distance between it and the sidewall 26 opposite thereto is greater than the total thickness of each leg 8 and projection 14 so that, as the legs 8 are inserted through each passageway 24, the wall 14 will be gradually flexed to permit movement of the leg 8 and projection 14 through the passageway 24. The surface of the passageway after the inclined surface 30 is substantially planar and parallel to the sidewall 26 opposite thereto until the indentations 32 are reached. When the hook portion 16 passes the beginning of the indentation 32, it is flexed outwardly so that the hook portion 16 and the indentation 32 form an uni-directional locking means for preventing movement of the legs 8 in a direction indicated by the arrow 34. The hook portion 16 and the indentation 32 permit a slight movement of the legs 8 in the direction of the arrow 34 so that a slight portion 36 of the legs 8 may be exposed above the housing 22. The arcuately extending portion 6 prevents movement of the legs 8 in a direction opposite to the arrow 34. The surface 38 of the sidewall 28 tapers outwardly toward the sidewall 26 opposite thereto until the exit portion of the passageway 24. When it is desired to unlock the access control lock 2, the arcuately extending portion 6 is pulled in the direction of the arrow 34 and a suitable tool is used to sever each leg 8 at the slight portion 36. Each leg 8 is then pushed in a direction opposite to the arrow 34 and removed from the body portion 20. The arcuately extending portion 6 and the severed legs 8 are discarded, but the body portion 20 is saved for later use. The hook portions 18 cooperate with the lips 40 to prevent the insertion of the legs 8 into each passageway 24 in the wrong direction.

The apparatus and method for forming the body portion 20 of the plastic lock 2 is described in relation to FIGS. 4-12. The molding means comprises a first mold part 50 and a second mold part 52 which are illustrated in the opened position in FIG. 4 and in the closed position in FIG. 5. Suitable means, such as a reciprocal ram 54, are used to move the first mold part 50 toward or away from the fixed second mold part 52. Only one first mold part 50 and second mold part 52 are illustrated, but it is understood that in actual operation, there are a multiplicity of first molds 50 and second molds 52 that may be moved between opened and closed positions by any conventional means. A conventional gate 56 is formed in the second mold part 52 to be connected to conventional apparatus so that plastic material may be injected therethrough into the closed first and second molds.

The first mold part 50 is illustrated in the opened position in FIGS. 6 and 9 and comprises a body member 60 having an open ended cavity 62 formed therein and defined by an end wall 64 and a plurality of sidewalls comprising a top wall 66, a bottom wall 68 and two opposite sidewalls 70 and 72. A pair of fixed arms 74 extend outwardly from the end wall 64 and have free end portions 76 which project outwardly from the open ended cavity 62. Each fixed arm 74 has three generally planar surfaces 78 and one non-planar surface 80. The non-planar surfaces 80 have an inclined generally planar surfaces 82 which form the inclined portions 30 of FIG. 3, generally planar surfaces 84 which are parallel to the sidewalls 70 and 72 and contoured surfaces 86 having portions 88 which ar inclined at a relative small angle to the planar surfaces 78 which are parallel to the sidewalls 70 and 72 and portions 90 that are inclined at a relatively large angle to the planar surfaces 78 which are parallel to the sidewalls 70 and 72. The purpose of the contoured surfaces 86 is described below. As illustrated, the fixed arms 74 are spaced from each other and from the top wall 66, the bottom wall 68 and the sidewalls 70 and 72. The end edge 92 of each fixed arm 74 is a feathered edge.

The second mold part 52 is illustrated in the opened position in FIGS. 6 and 8 and comprises a body member 100 having an open ended cavity 102 formed therein and defined by an end wall 104, a top wall 106, a bottom wall 108 and two opposite sidewalls 110 and 112. A pair of movable arms 114 are mounted for limited rotational movement on pivotal mounting means 116 on the end wall 104. The mounting means 116 are illustrated specifically in FIGS. 10-14 and comprise a support member 118 fixedly mounted in a recess in the body member 100. The support member 118 has two spaced apart arcuate surfaces 120 having an arcuate extent of about 180 degrees with the surface of the end wall 104 being tangent thereto at the 90 degree location. The support member 118 is part of a hinge with one knuckle 122 thereof being integral with the support member 118 and having an arcuate outer peripheral surface 124 having a diameter slightly greater than the diameter of the arcuate surfaces 120. Each movable arm 114 has a centrally located arcuate surface 126 and two spaced apart knuckles 128 having an arcuate outer peripheral surface 130 having a diameter substantially the same as the diameter of the arcuate surface 126. The knuckle 122 has a central opening 132 and the two knuckles 128 have central openings 134 extending therethrough so that a pivot pin 136 may be inserted through the openings 132 and 134 to form a hinge connection between the movable arm 114 and the support member 118. The outer peripheral surfaces 130 are formed from a block of material having a thickness slightly greater than the diameters of the outer peripheral surfaces 130 so as to form abutment shoulders 138 and 140 thereon which cooperate with the abutment edges 142 at the extremities of the arcuate surface 120 formed by the differences in the diameters of the arcuate surfaces 120 and the arcuate outer peripheral surface 124 of the knuckle 122 to limit the rotational movement of the movable arms 114 for purposes described below. However, it is understood that each movable arm 114 rotates freely in the ar of rotation defined by the abutment shoulders 138 and 140 and the abutment edges 142. Each movable arm 114 has three generally planar surfaces 144 and one contoured surface 146 having a generally planar portion 148, an arcuate portion 150 and another relatively short planar portion 152 which is tangent to the end of the arcuate portion 150. The rotational limits of the movable arms 114 are illustrated in FIG. 6 wherein the abutment shoulders 138 of the movable arm 114 on the left and the abutment edges 142 are in contacting relationship and the abutment shoulders 140 of the movable arm 114 on the right and the abutment edges 142 are in contacting relationship. The purpose of the limited movement of the movable arm 114 on the left is so that the portion 88 of the contoured surface 86 adjacent to the end edge 92 will contact the movable arm 114 and rotate it for purposes described below. The purpose of the limited movement on the movable arm 114 on the left is so that the gate opening 56 is located between the movable arms for purposes described below.

The relative location of the fixed arms 74 and the movable arms 114 during the actual molding of the three dimensional plastic article 2 is illustrated in FIG. 7. As the first and second molds 50 and 52 are moved from the opened position of FIG. 6 to the closed position of FIG. 7, the portion 88 of the contoured surface 86 of the fixed arm 74 on the left will contact and rotate the movable arm 114 on the left. The movable arm may rotate only as far as illustrated on the left of FIG. 7 or it may continue to rotate through an arc of the same extent as that illustrated on the right of FIG. 6 so that the abutment shoulders 140 thereof are in contacting relationship with the abutment edges 142. When the first and second molds 50 and 52 are in the closed position of FIG. 7, the three generally planar surfaces 78 of the fixed arms 74 and the respective three generally planar surfaces 144 of the movable arms 114 are co-planar. As the plastic material is injected through the gate opening 56 in the top wall 106, it contacts the planar surfaces 144 of the movable arms 114 opposite to the contoured surfaces 146 and rotates them until the contoured surfaces 146 are in a continuous contacting relationship with the contoured surfaces 86. In this relationship, each of the facing surfaces of the pair of movable arms 114 are non-planar and have a first portion extending from the end wall 64 in a linear direction parallel to a plane passing through and containing the aligned longitudinal axes 153 of the first and second mold parts 50 and 52 and such plane being parallel to the opposite sidewalls of the cavity formed by the first and second mold parts 50 and 52; a second portion extending from the first portion in a linear direction and parallel to the plane and parallel to the opposite sidewalls; third portion extending from the second portion and projecting inwardly toward the plane to form an angular relationship with the second portion of preferably not more than 90 degrees and a fourth portion extending from the third portion in a linear direction and having an acute angular relationship with the plane and terminating at the end wall 104. While the angular relationship between the second and third portions can be slightly greater than 90 degrees, it cannot be so great so as to provide an inclined surface which would permit the gradual compression of the locking member 14. Since the forces in the closed mold part during the molding process are in equilibrium, there is no tendency to separate the movable arms 114 from the fixed arms 74.

The fixed arms 74 and the movable arms 114 can be of any transverse cross-sectional configuration, such as round, square, rectangular, and have a shape that permits them to be pulled out to form the passageways 24 after the three dimensional article has been cured. When the contoured surfaces of the fixed 74 and movable arms 114 are in the continuous contacting relationship, they form a member extending between the end walls 64 and 104 which member has a relatively large internal transverse cross-sectional configuration 160 that is greater than the smallest internal configurations 162 and 164 between the relatively large internal transverse cross-sectional configuration and the end wall 64 or 104. The fixed arms 74 have an outer peripheral surface permitting them to be withdrawn from the three dimensional plastic article after the injected plastic material has been cured. The movable arms 114 have an outer peripheral surface which cooperates with the rotational movement of the rotatable arms in permitting the movable arms to be withdrawn through the relatively small internal cross-sectional configurations 164 after the injected plastic material has been cured to form the three dimensional plastic article. In the embodiment illustrated in FIG. 7, as the first and second mold parts 60 and 100 are moved from the closed position to the opened position, the fixed arms 74 are withdrawn from the cured three dimensional plastic article 20. After that, a conventional ejector system (not shown) applies a force on the three dimensional article 20 so that the movable arms rotate as they are withdrawn through the relatively small internal cross-sectional configurations 164 of the three dimensional plastic article. The white portions of FIG. 7 correspond to the cross-hatched portions of FIG. 3 and the cross-hatched portions of the fixed and movable arms 74 and 114 correspond to the white portions of FIG. 3. The end wall 104 has a central raised portion 166 to cooperate with the movable arms 114 to form the lips 40. As the first and second molds 50 and 52 are moved from closed position to the opened position, conventional means (not shown) are used to remove the three dimensional article 2 from the fixed arms 74 and the movable arms 114. As illustrated in FIGS. 3 and 7, there is nothing to prevent the fixed arms 74 from moving through the entrances of the passageways 24 and the movable arms 114 from moving through the exits of the passageways 24. While the general cross-sectional configuration of the legs 8 and passageways 24 are illustrated as being rectangular, it is understood that they can be of any cross-sectional configuration as long as the legs 8 have some type of a resilient projection and the passageways have some type of an internal indentation. The links 4 are made from an acetal resin or other materials having similar characteristics. The body portions 20 are made from a glass reinforced nylon or other materials having similar characteristics.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Method for forming a three dimensional injection molded article having at least one passageway extending therethrough and having at least one internal indentation formed therein using first and second mold parts each of which has an open ended cavity formed therein and having at least an end wall and a plurality of sidewalls comprising:
   mounting at least one fixed arm on said end wall of said first mold part and spaced from each of said sidewalls and having a portion thereof projecting out of said cavity and having at least one contoured surface;
   mounting at least one movable arm on said end wall of said second mold part for rotation about a fixed axis and having at least one contoured surface adapted to be moved into continuous contacting relationship with said at least one contoured surface of said at least one fixed arm;
   moving said first and second mold parts from an opened to a closed position;
   injecting material into the cavity formed by said closed first and second mold parts; then
   positioning said at least one movable member to form said continuous contacting relationship between said contoured surfaces and forming at least one protruding portion to form said internal indentation; then
   continuing said injecting of said material until said cavity formed by said first and second mold parts has been filled;
   curing said injected material to form said three dimensional article;
   forming said fixed arm so that it can be withdrawn from said cured three dimensional article;
   forming said movable arm so that it can cooperate with its rotational movement and be withdrawn from said cured three dimensional article.

2. Method as in claim 1 and further comprising:
   using said injected material to position or hold in place said at least one movable member.

3. Method as in claim 2 and further comprising:
   limiting said rotational movement of said at least one movable member in a clockwise direction and in a counter-clockwise direction.

4. Method as in claim 1 and further comprising:
   mounting at least one additional fixed arm on said end wall of said first mold part;
   mounting at least one additional movable arm on said end wall of said second mold part for rotation about a fixed axis and having at least one contoured surface adapted to be moved into continuous contacting relationship with said contoured surface of said at least one additional fixed arm;
   injecting said material into said cavity formed by said closed first and second molds at a location between said at least one movable arm and at least one additional movable arm so that said material positions or holds in place said at least one movable arm and said at least one additional movable arm to form said continuous contacting relationships between said contoured surfaces and forming at least one additional protruding portion;
   curing said injected material to form said three dimensional article;
   forming said at least one additional fixed arm so that it can be withdrawn from said cured three dimensional article; and
   forming said at least one additional movable arm so that it can cooperate with its rotational movement and be withdrawn from said cured three dimensional article.

5. Method as in claim 4 and further comprising:
   limiting said rotational movement of each of said at least one movable arm and said at least one additional movable arm in a clockwise direction and in a counter-clockwise direction.

6. Apparatus for forming a three dimensional injection molded article having at least one passageway extending therethrough and having at least one internal indentation formed therein comprising:
   a first mold part having an open ended cavity formed therein and defined by an end wall and a plurality of sidewalls;

at least one fixed arm on said end wall; at least one contoured surface on said at least one fixed arm;

at least a portion of said at least one fixed arm located in said cavity and spaced from each of said plurality of sidewalls;

a second mold part having an open ended cavity formed therein and defined by an end wall and a plurality of sidewalls;

at least one movable arm; pivot means mounted on said end wall of said second mold part for permitting rotational movement of said at least one movable arm around a fixed axis;

said at least one movable arm being spaced from said plurality of sidewalls;

at least one contoured surface on said at least one movable arm;

moving means for moving said first and second mold parts to an opened or closed position;

a gate opening in at least one of said first and second mold parts for injecting material into the cavity formed by said first and second mold parts when in a closed position;

oppositely facing portions of said contoured surfaces on said at least one fixed arm and said at least one movable arm being in a continuous contacting relationship after said first and second mold parts have been moved to the closed position and said material has been injected into said cavity formed by said first and second mold parts;

said fixed and movable arms when in said continuous contacting relationship combine to form a member extending between said end walls of said first and second mold parts and having a relatively large internal transverse cross-sectional configuration that is greater than the smallest internal transverse cross-sectional configuration between said relatively large internal transverse cross-sectional configuration and both of said end walls of said first and second mold parts so as to form said internal indentation;

said fixed arm having an outer peripheral surface permitting it to be withdrawn from said three dimensional article after said injected material has been cured; and said movable arm having an outer peripheral surface which cooperates with said rotational movement thereof in permitting it to be withdrawn from said three dimensional article after said injected material has been cured.

7. Apparatus as in claim 6 wherein:

said fixed arm being removed from said cured three dimensional article prior to the removal of said movable arm.

8. Apparatus as in claim 6 and further comprising:

said first and second mold parts having aligned central longitudinal axes; and said at least one fixed arm and said at least one movable arm when said contoured surfaces thereof are in said continuous contacting relationship having a generally rectangular cross-sectional configuration and an outer peripheral surface having three generally planar lengthwise extending surfaces and one non-planar lengthwise extending surface.

9. Apparatus as in claim 6 and further comprising:

movement limiting means for limiting rotational movement of said at least one movable arm in a clockwise direction and in a counter-clockwise direction.

10. Apparatus as in claim 9 wherein:

said first and second molds when in said closed position form an internal cavity having at least two end walls and at least four lengthwise extending sidewalls; and said gate opening being located in one of said sidewalls so that said material injected therethrough will move and hold said at least one movable arm to form said continuous contacting relationship between said contoured surfaces.

11. Apparatus for forming a three dimensional injection molded article having at least a pair of passageways extending therethrough in generally parallel directions and having at least one internal indentation in each passageway comprising:

a first mold part having an open ended cavity formed therein and defined by an end wall and a plurality of sidewalls;

at least a pair of fixed arms on said end wall;

said at least a pair of fixed arms being in a generally parallel relationship;

at least portions of said at least a pair of arms being located in said cavity and spaced from each other and from each of said sidewalls, at least one contoured surface on each of said at least a pair of arms;

a second mold part having an open ended cavity formed therein and defined by an end wall and a plurality of sidewalls;

at least a pair of movable arms;

pivot means mounted on said end wall of said second mold part on which said at least a pair of movable arms are pivotally mounted for permitting rotational movement of each of said at least a pair of movable arms around its own fixed axis;

said at least a pair of movable arms being spaced from each other and from each of said sidewalls;

at least one contoured surface on each of said at least a pair of movable arms in a facing relationship with said contoured surfaces on said fixed arms;

moving means for moving said first and second mold parts to an opened or closed position;

a gate opening in at least one of said first and second mold parts for injecting material into the cavity formed by said first and second mold parts when in said closed position;

each of said at least a pair of movable arms being located relative to each of said at least a pair of fixed arms so that facing portions of their contoured surfaces are in a continuous contacting relationship after said first and second mold parts have been moved to a closed position and said material has been injected into said cavity formed by said first and second mold parts;

said fixed and movable arms when in said continuous contacting relationship combine to form a pair of spaced apart members each extending between said end walls of said first and second mold parts and each having a relatively large internal transverse cross-sectional configuration that is greater than the smallest internal transverse cross-sectional configuration between said relatively large internal transverse cross-sectional configuration and both of said end walls of said first and second mold parts so as to form said internal indentations;

each of said fixed arms having an outer peripheral surface permitting it to be withdrawn from said three dimensional article after said injected material has been cured; and each of said movable arms having an outer peripheral surface which cooperates with said rotational movement thereof in permitting it to be withdrawn from said three dimensional article after said injected material has been cured.

12. Apparatus as in claim 11 wherein:

said fixed arms being removed from said cured three dimensional article prior to the removal of said movable arms.

13. Apparatus as in claim 11 and further comprising:

said first and second mold parts having aligned central longitudinal axes; and each of said at least a pair of fixed arms and each of said at least a pair of movable arms when said contoured surfaces thereof are in said continuous contacting relationship having a generally rectangular cross-sectional configuration and an outer peripheral surface having three lengthwise extending surfaces each of which is substantially planar and one lengthwise extending surface which is non-planar.

14. Apparatus as in claim 13 and further comprising:

movement limiting means for limiting rotational movement of each of said at least a pair of movable arms in a clockwise direction and in a counter-clockwise direction.

15. Apparatus as in claim 14 wherein:

said first and second mold parts in said closed position form an internal cavity having at least two end walls, a top wall, a bottom wall and two opposite sidewalls;

said plurality lengthwise extending substantially planar surfaces being generally parallel to and facing said top and bottom walls and one of said sidewalls; and said lengthwise extending non-planar surfaces spaced from and facing each other.

16. Apparatus as in claim 10 wherein each of said lengthwise extending non-planar surfaces comprises:

a first portion extending from one of said end walls in a linear direction having an acute angular relationship with a plane passing through said aligned longitudinal axes and parallel to said opposite sidewalls;

a second portion extending from said first portion in a linear direction and parallel to said plane;

a third portion extending from said second portion and projecting inwardly toward said plane so as to form an angular relationship with said second portion of at least not more than 90 degrees; and a fourth portion extending from said third portion in a linear direction and having an acute angular relationship with said plane and terminating at the other end wall.

17. Apparatus as in claim 16 wherein:

each of said surfaces having a linearly extending portion and a extending portion; and said gate opening in said second mold part member between said least a pair of movable members.

18. Apparatus as in wherein said pivot means comprises:

a hinge.

19. Apparatus as in claim 18 wherein said hinge comprises:

a first portion on said end wall;

said first portion having at least two spaced apart arcuate surfaces an arcuate extent of about 180 degrees;

said first portion having at least one knuckle located between said two arcuate surfaces and having an arcuate outer peripheral having an arcuate extent of about 180 degrees;

said arcuate outer peripheral surface having a diameter slightly greater the diameter of each of said arcuate surfaces so end edges are formed on said arcuate surfaces;

a second portion located at one end of each of said at least a pair of arms;

said second portion having at least one arcuate surface having an of about 180 degrees;

said second portion having at least two spaced apart knuckles having said at least one arcuate surface located therebetween and each of said knuckles having an arcuate outer peripheral surface having an arcuate extent of about 180 degrees;

each of said two spaced apart knuckles formed from a block of material having a thickness greater than the diameter of said arcuate outer peripheral surfaces to form a plurality of abutment shoulders;

each of said knuckles having a central opening extending therethrough;

a pivot pin passing through said openings to hold said knuckles together for rotational movement about said pivot pin;

said end edges on one side of said two spaced apart arcuate surfaces said abutment shoulders on one side of said at least pair of knuckles limiting rotational movement of each of said at least a pair of movable arms in one arcuate direction; and said end edges on other side of said two spaced apart arcuate and said abutment shoulders on the other side of least a pair of knuckles limiting rotational movement of each of said at least a pair of movable arms in an opposite arcuate direction.

20. Apparatus as in claim 14 wherein:

said movement limiting means being located to position said at least a pair of movable arms relative to said at least a pair of fixed arms so that said first and second mold parts can be moved from said opened position to said closed position and to position said at least a pair of movable arms so that said gate opening is located therebetween.

* * * * *

UNITED STATES PATENT AND TRADEMARK OFFICE
CERTIFICATE OF CORRECTION

PATENT NO. : 4,956,142

DATED : September 11, 1990

INVENTOR(S) : Peter G. Mangone, Jr.

It is certified that error appears in the above-identified patent and that said Letters Patent is hereby corrected as shown below:

In the Abstract:
    2nd col., l. 22    delete "relationship" and insert therefor --relationships-- col. 5, l. 59    delete "ar" and insert therefor --arc--
col. 6, l. 44    before "third" insert --a--

Cl. 17, col. 12, l.1  before "surfaces" insert --contoured--
                 l.2  delete "a" and insert therefor --an arcuately--

Cl. 19, col.12, l.10  after "portion" insert --mounted--
              l.12  after "surfaces" insert --having--
              l.16  after "peripheral" insert --surface--
              l.19  after "greater" insert --than--
              l.20  after "so" insert --that--
              l.23  after "of" insert --movable--
              l.25  after "an" insert --arcuate extent--
              l.41  after "surfaces" insert --and--
              l.42  after "least" insert --a--
              l.45  after "on" insert --the--
              l.46  after "arcuate" insert --surfaces--

UNITED STATES PATENT AND TRADEMARK OFFICE
CERTIFICATE OF CORRECTION

PATENT NO. : 4,956,142

DATED : September 11, 1990

INVENTOR(S) : Peter G. Mangone, Jr.

It is certified that error appears in the above-identified patent and that said Letters Patent is hereby corrected as shown below:

Cl. 19, col. 12, line 47, after "of" insert --said at--

Signed and Sealed this

Twenty-eighth Day of January, 1992

Attest:

HARRY F. MANBECK, JR.

*Attesting Officer*        *Commissioner of Patents and Trademarks*